Figure 1:
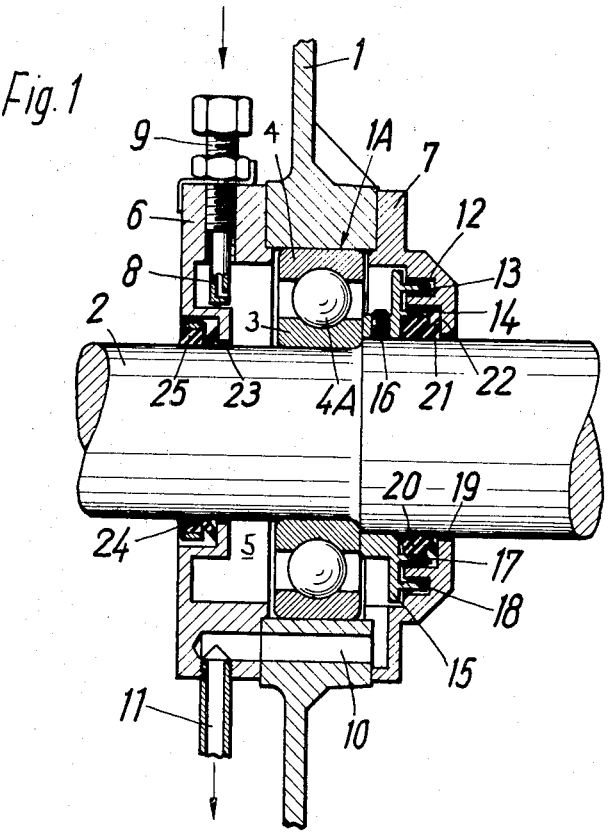

United States Patent

Dohmen

[15] 3,679,277
[45] July 25, 1972

[54] SEALED BEARINGS LUBRICATED BY A LUBRICATING MEDIUM

[72] Inventor: Heinz Dohmen, Dominikus-Vraetz-Str. 23, 4070 Rheydt, Germany

[22] Filed: Jan. 20, 1971

[21] Appl. No.: 107,946

[30] Foreign Application Priority Data

Jan. 30, 1970 Germany..................P 20 04 167.2

[52] U.S. Cl. ........................................308/187.1, 310/90
[51] Int. Cl. .................................................F16c 1/24
[58] Field of Search ..............310/90, 89, 91; 308/187.1, 308/187.2, 36.1

[56] References Cited

UNITED STATES PATENTS

| | | | |
|---|---|---|---|
| 3,048,724 | 8/1962 | Mueller | 310/90 |
| 3,259,442 | 7/1966 | Boghosian | 308/187.1 |
| 2,769,105 | 10/1956 | Altschwager | 310/90 |
| 3,447,843 | 6/1969 | Shipman | 308/187.1 |
| 2,694,157 | 11/1954 | Cone | 310/90 |

*Primary Examiner*—J. D. Miller
*Assistant Examiner*—R. Skudy
*Attorney*—Curt M. Avery, Arthur E. Wilfond, Herbert L. Lerner and Daniel J. Tick

[57] ABSTRACT

A dynamoelectric machine, such as a motor, has its rotor shaft journaled in antifriction bearings which are seated in an opening of the machine housing and are sealed from the interior and exterior of the machine by elastically deformable glide-ring structures, the bearing space communicating with the outside through lubricant injection and drainage duct means. A cover is rigidly mounted on the machine housing on the inner side thereof and coaxially surrounds the shaft. The cover and the shaft form together an annular air gap labyrinth having fixed parts mounted on the cover and rotatable parts fastened to the rotor shaft, the respective parts of the labyrinth seal straddling each other so that the effective length of the air gap is correspondingly extended. A glide-ring seal coaxially surrounds the shaft and is seated on the shaft to seal the extended air gap.

5 Claims, 2 Drawing Figures

PATENTED JUL 25 1972 3,679,277

Inventor:
HEINZ DOHMEN

SEALED BEARINGS LUBRICATED BY A LUBRICATING MEDIUM

My invention relates to an electric motor whose rotor shaft is revolvably journaled in antifriction bearings mounted in a wall opening of a machine housing.

More specifically, the invention concerns improvements of an electric machine, preferably a motor, in which the housing structure of the machine comprises two cover members which are located on opposite sides respectively of each antifriction bearing and which hermetically close the opening in the housing wall in which the bearing proper is accommodated. The bearing space thus closed and sealed by the covers communicates with the outside through an injection nozzle for supplying lubricant, preferably a mixture of oil and air, and also with a drainage outlet for the lubricant. The covers which enclose this bearing space are sealed relative to the rotor shaft with the aid of elastically deformable glide-ring seals.

Electric motors of this type are used for example in refining plants and other localities where the motors must be dust-tightly or liquid-tightly enclosed and are used as drive motors in larger numbers under conditions where a continuous maintenance or inspection of the motor bearings by hand, requiring correspondingly trained personnel, is infeasible, and the motors on account of the dusty atmosphere of their surroundings tend to become soiled at the bearings. The motors in such cases are then connected to a central lubricating equipment which continuously lubricates the individual antifriction bearings with a mist of an oil-air mixture and simultaneously rinses the bearing spaces. Under such operating conditions, the motors must be completely oil-tight in the vicinity of the antifriction bearings and relative to the interior of the housing in which the dynamoelectric components are situated, thus preventing the motor housing from becoming gradually filled with lubricant.

It has been attempted therefore to provide for an oil-tight seal with the aid of a conventional glide-ring seal of the gasket type in order to close the bearing space and the cover which separates this bearing space from the remaining interior of the machine. It has been found, however, that due to the relatively high excess pressure in the space of the antifriction bearing, the ingress of oil into the motor housing proper can be reliably prevented only under adjusting conditions of the glide-ring seal that detrimentally promote excessive mechanical wear of the glide-ring material. The glide ring becomes worn down rather rapidly, loses its sealing ability and must be replaced rather rapidly thus obviating or counteracting the desire of reducing maintenance work.

It is an object of my invention, therefore, to improve the sealing qualities and the useful lifetime of the glide-ring seals in dynamoelectric machines, preferably motors, having a type of design as described in the foregoing.

To this end, and in accordance with a feature of my invention, the air gap between the rotor shaft on the one hand and the cover which is mounted on the housing structure in the interior of the housing for the purpose of closing the space that accommodates the antifriction bearing, is extended in length by providing air gap labyrinth parts that are fixed components of the cover to remain at standstill, and labyrinth parts which are fastened into the rotor shaft to rotate together therewith, the respective fixed and rotating parts being arranged in mutually straddling relation thus greatly extending the effective length of the air gap. Furthermore, the end of the air gap is sealed by a glide-ring seal coaxially surrounding and seated on the shaft.

By virtue of these features of my invention, the glide-ring seals are greatly relieved from the pressure of the lubricant contained in the bearing space, as long as the rotor shaft is rotating. This pressure relief at the glide-ring seals comes about by the fact that because of the rotation of the rotor shaft the quantity of oil contained in the labyrinth is continuously driven back into the bearing-accommodating space. Hence, the glide-ring shields can be adjusted in the conventional or most convenient manner and the frictional wear to which these ring seals are subjected is reduced to a conventional, permissible limit.

According to another feature of my invention, an electric motor or the like machine involving the features already described, has the glide-ring seal at the end of the labyrinth designed as a lip-type seal whose lip is braced against a radially extending wall of the air gap labyrinth. The glide-ring lip-type sealing structure may be directly arranged on the rotor shaft. According to a further feature of the invention, it is preferable, however, to arrange the lip-type seal directly on a structural component which extends axially and constitutes part of the air gap labyrinth portion that rotates together with the rotor shaft. This serves the further advantage and object of my invention to greatly facilitate the assembling work required in the manufacture of the machine.

The above-mentioned and further objects, advantages and features of my invention, said features being set forth with particularity in the claims annexed hereto, will be apparent from the following description of two embodiments illustrated in:

FIG. 1 by an axial section of the machine housing and bearing assembly; and in

Figure 2:
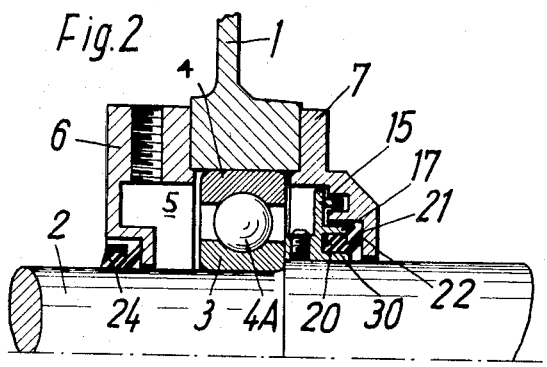

FIG. 2 by a sectional and partial view of a modified portion of the housing and bearing assembly.

The same reference characters are used in both illustrations for corresponding items respectively.

In FIG. 1 is shown the bearing shield of an induction (asynchronous) motor whose rotor shaft 2 extends horizontally and is journaled in the motor housing by means of two antifriction bearings, such as illustrated ball bearings, only one of the bearings being shown. Each bearing is seated in an opening 1A of the bearing shield 1 and comprises an inner race ring 3, an outer race ring 4 and intermediate balls 4A. The inner race ring 3 of each bearing is directly seated upon the rotor shaft 2, and the outer race ring is directly and snugly seated in the cylindrical opening 1A of the machine housing 1. The bearing space 5 between the bore 1A and the shaft 2, wherein the antifriction bearing 3, 4, 4A is accommodated, is closed by two ring-shaped cover members 6 and 7 toward the outside and toward the inside, respectively, of the motor housing. The cover member 6 is provided with a nozzle 8 which can be connected through a line 9 with a central lubricating device. During operation of the machine, the nozzle 8 injects into the bearing space 5 a mixture of oil and air under pressure for lubricating the bearing.

The lubricant mixture can leave the bearing space 5 to pass back to the central lubricating device, if desired, via a drainage duct 10 in the bearing shield 1 and an outlet line 11 extending from the cover member 6.

The cover member 7 facing the inner space of the motor housing is provided with extensions whose surfaces 12, 13 and 14 extend in axial relation to the shaft 2.

A component 15 is fastened to the shaft 2 by means of a screw bolt 16 to rotate together with the shaft 1. Part 15 has extensions 17 and 18 which are coaxially related to the shaft 2. The extensions 17 and 18, on the one hand, and the extension surfaces 12, 13, 14, on the other hand, all of them being concentric to the rotor shaft 2, straddle each other.

As a result, the air gap 19 remaining between the cover 7 and the shaft 2 is greatly extended in length by meandering paths formed by the individual gaps alternately extending axially and radially of the shaft 2. The extends labyrinth gap is sealed at its inner end by a glide ring 20 directly in the vicinity of the gap 19. The glide ring 20 has a lip-shaped extension 21 which is braced against a wall portion 22 of a cover 7, the wall portion 22 extending radially to the rotor shaft.

The air gap 23 remaining between the cover 6 and the shaft 2 is sealed by means of a second glide-ring lip seal 24, which is framed by a metal ring 25 to prevent damage to, or destruction of, the elastic glide-ring at high speeds of the shaft. In the modification shown in FIG. 2, otherwise designed and operative as described above with reference to FIG. 1, the glide-ring 20 is mounted on an extension 30 of the structure 15 between the extension 30 and the extension 17, both extending in coaxial relation to the shaft 2. With such a design, the entire structure 15 with its concentric extensions 17 and 30 as well as together with the glide ring 20 can be displaced axially of the rotor shaft 2 and, when the device is being assembled, can be readily adjusted with respect to the contact pressure of the lip 21 relative to the wall 22.

In motors according to the invention as exemplified on the drawing, the elastically deformable sealing ring structures may assume a relatively high temperature during continuous operation since the temperatures in the vicinity of the inner bearing cover may be heated to about 100° C or more. For that reason, these deformable rings are preferably made of temperature-resistant rubber or elastomer material whose aging is not affected by temperatures of such magnitudes.

It is within the scope of the invention to shorten or extend the labyrinth paths as compared with those shown in FIGS. 1 and 2 of the accompanying drawing. For such purposes, the number of the component parts extending axially of the shaft can be correspondingly reduced or increased.

To those skilled in the art it will be obvious upon a study of this disclosure that the above-mentioned and other modifications are readily applicable without departing from the essential features of my invention and within the scope of the claims annexed hereto.

I claim:

1. An electric motor comprising a machine housing having a wall with an opening defining a bearing space, a rotor shaft revolvably traversing said wall opening and space, an antifriction bearing device seated in said space and journaling said shaft, closure means coaxially surrounding said shaft and having elastically deformable glide-ring seals for tightly closing said space on opposite sides of said bearing device, oil-air injection means and lubricant drainage duct means communicating from the outside with said bearing space for circulating pressure lubricant through said bearing device, the combination of a cover rigidly mounted on said machine housing on the inner side thereof and coaxially surrounding said shaft for closing said space and said bearing device from the machine interior, said cover and said shaft forming an annular air gap between each other, an air gap labyrinth serving to dissipate pressure of pressure lubricant entering therein from said bearing space, said labyrinth having fixed parts mounted on said cover and parts fastened to said shaft to revolve together therewith, said respective parts straddling each other and thereby extending the effective length of said air gap, and a glide-ring seal coaxially surrounding and seated on said shaft and having at least one part having at least one surface communicating with said gap and another surface contacting said cover to seal said gap, whereby the remaining pressure of the lubricant in said labyrinth maintains said part against said cover at a minimal pressure.

2. With a dynamoelectric machine comprising a machine housing with an opening defining a bearing space, a rotor shaft revolvably traversing said space from within to without said housing, an antifriction bearing device seated in said space and journaling said shaft, closure means coaxially surrounding said shaft and having elastically deformable glide-ring seals for tightly closing said space on opposite sides of said bearing device, and lubricant injection and drainage duct means communicating from the outside with said bearing space, the combination of a cover rigidly mounted on said machine housing on the inner side thereof and coaxially surrounding said shaft for closing said space and said bearing device from the machine interior, said cover and said shaft forming an annular air gap between each other, an air gap serving to dissipate pressure of pressure lubricant entering therein from said bearing space, said labyrinth having fixed parts mounted on said cover and parts fastened to said shaft to revolve together therewith, said respective parts straddling each other and thereby extending the effective length of said air gap, and a glide-ring seal coaxially surrounding and seated on said shaft and having at least one part having at least one surface communicating with said gap and another surface contacting said cover to seal said gap, whereby the remaining pressure of the lubricant in said labyrinth maintains said part against said cover at a minimal pressure.

3. In an electric machine according to claim 2, said part of said glide-ring seal being an annular lip-shaped protrusion, and said cover having an annular wall portion extending radially and peripherally about said shaft and in proximity thereto, said lip-shaped protrusion being in gliding engagement with said cover annular portion for sealing said air gap.

4. An electric machine according to claim 2, comprising an annular structure having two parts coaxial to said shaft and to each other, said structure being fixed to said shaft to revolve together therewith and forming an annular space between each other, said glide-ring seal being seated in said latter space.

5. In a machine according to claim 2, said annular structure being axially displaceable on said shaft, and set screw means for positionally fixing said structure on said shaft.

* * * * *